(12) United States Patent
Allouis et al.

(10) Patent No.: US 12,246,858 B2
(45) Date of Patent: Mar. 11, 2025

(54) ASSEMBLY APPARATUS

(71) Applicant: Airbus Defence and Space Limited, Stevenage (GB)

(72) Inventors: Elie Allouis, Stevenage (GB); Alexander Hall, Stevenage (GB); John Carroll, Stevenage (GB)

(73) Assignee: Airbus Defence and Space Limited, Stevenage (GB)

( * ) Notice: Subject to any disclaimer, the term of this patent is extended or adjusted under 35 U.S.C. 154(b) by 181 days.

(21) Appl. No.: 17/791,344

(22) PCT Filed: Jan. 13, 2021

(86) PCT No.: PCT/GB2021/050078
§ 371 (c)(1),
(2) Date: Jul. 7, 2022

(87) PCT Pub. No.: WO2021/144571
PCT Pub. Date: Jul. 22, 2021

(65) Prior Publication Data
US 2023/0042339 A1    Feb. 9, 2023

(30) Foreign Application Priority Data
Jan. 15, 2020   (EP) ................................... 20275010

(51) Int. Cl.
*B64G 1/64*   (2006.01)
*B64G 1/22*   (2006.01)
(Continued)

(52) U.S. Cl.
CPC ............ *B64G 1/648* (2013.01); *B64G 1/222* (2013.01); *B64G 4/00* (2013.01); *B64G 2004/005* (2013.01); *B64G 99/00* (2022.08)

(58) Field of Classification Search
CPC ......... B64G 1/648; B64G 1/222; B64G 4/00; B64G 99/00; B64G 2004/005
See application file for complete search history.

(56) References Cited

U.S. PATENT DOCUMENTS

| 4,083,520 | A |   | 4/1978 | Rupp et al. |
| 4,599,832 | A | * | 7/1986 | Benton ................. E04H 12/185 52/645 |

(Continued)

OTHER PUBLICATIONS

Mar. 29, 2021 Search Report issued in International Patent Application No. PCT/GB2021/050078.

(Continued)

*Primary Examiner* — Joshua J Michener
*Assistant Examiner* — Cindi M Curry
(74) *Attorney, Agent, or Firm* — Nelson Mullins Riley & Scarborough LLP (57) ABSTRACT

The present invention relates to an assembly apparatus for assembling components of spacecraft in space. The assembly apparatus includes: a core platform; and a mobile platform including an end effector configured to perform an assembly or manufacturing task. The mobile platform is connected to the core platform by a tether. The core platform includes a body and a coupling element connected to and extendable from the body such that the coupling element may be spaced from the body of the core platform. The tether connects the mobile platform to the body via the coupling element. The assembly apparatus further includes an actuator configured to vary the length of the tether extending between the coupling element and the mobile platform to control the position of the mobile platform relative to the body of the core platform.

11 Claims, 6 Drawing Sheets

(51) Int. Cl.
*B64G 4/00* (2006.01)
*B64G 99/00* (2009.01)

(56) References Cited

U.S. PATENT DOCUMENTS

| | | | |
|---|---|---|---|
| 4,750,692 A | | 6/1988 | Howard |
| 5,110,294 A | | 5/1992 | Brand et al. |
| 5,184,444 A | * | 2/1993 | Warden .................. H01Q 1/1235 52/118 |
| 5,197,341 A | * | 3/1993 | Steeves .................. G01M 99/00 248/661 |
| 5,407,152 A | | 4/1995 | Pelischek |
| 6,945,499 B1 | | 9/2005 | Robinson |
| 2009/0134107 A1 | * | 5/2009 | Doggett .................. B64G 4/00 212/239 |
| 2009/0184207 A1 | * | 7/2009 | Warren .................. B66C 23/68 244/172.6 |
| 2016/0264264 A1 | * | 9/2016 | Helmer .................. B64G 1/222 |
| 2017/0093046 A1 | * | 3/2017 | Harvey .................. H01Q 1/288 |
| 2023/0042339 A1 | * | 2/2023 | Allouis .................. B64G 1/222 |

OTHER PUBLICATIONS

Mar. 29, 2021 Written Opinion of the International Searching Authority issued in International Patent Application No. PCT/GB2021/050078.

\* cited by examiner

ASSEMBLY APPARATUS

CROSS-REFERENCE TO RELATED APPLICATIONS

This application claims priority to and is a 35 U.S.C. § 371 U.S. National Stage Application of International Application No. PCT/GB2021/050078, entitled "AN ASSEMBLY APPARATUS", filed Jan. 13, 2021, which claims priority to European Application No. 20275010.5, entitled "AN ASSEMBLY APPARATUS", filed Jan. 15, 2020, the contents of each being incorporated by reference herein in its entirety.

TECHNICAL FIELD OF THE INVENTION

The technical field of the present invention is assembly manufacturing apparatuses. More specifically, the technical field of the present invention is assembly apparatus for the assembly of components of spacecraft in space.

BACKGROUND OF THE INVENTION

Placing spacecraft into space is a complex task in which an increase in mass of the spacecraft to be placed into space can dramatically increase the cost of the operation. Furthermore, the spacecraft must also fit within given dimensions of the launch vehicle which carries the spacecraft to space. Thus, spacecraft with large dimensions or which require, for example, large solar arrays or antennae have two options for fitting within the payload volume of the launch vehicle.

The first option is to design foldable and/or deployable parts of the spacecraft so that the spacecraft can be in a retracted state until placed in space at which time it can deploy into its extended, operational state. However, these foldable and/or deployable parts are complex to design and build, and also increase the weight of the spacecraft, thus increasing the cost to launch.

The second option is to complete the assembly of the spacecraft once the spacecraft is in space. However, known apparatuses rely on robots which move along spacecraft structures using multiple arms like spider or monkey. The arms of these robots are highly complex and require multiple degree of freedom systems, i.e. at least 3 per arm. Thus, there is an inherent risk of wear and failure for each mechanism over the time period of the manufacture operation. Some known apparatuses use a free-flyer to move around a workspace. However, these flyers require a significant amount of fuel and malfunction of the flyer can result in destruction of the spacecraft and/or loss of the flyer.

SUMMARY OF THE INVENTION

It is an object of the present invention to provide an advantageous assembly apparatus for assembling and/or manufacturing components of spacecraft in space.

In accordance with embodiments of the invention described herein, there is provided an assembly apparatus for assembling or manufacturing components of spacecraft in space, the assembly apparatus comprising: a core platform; and a mobile platform comprising an end effector configured to perform an assembly task; the mobile platform being connected to the core platform by a tether; the core platform comprising a body and a coupling element connected to and extendable from the body such that the coupling element may be spaced from the body of the core platform; wherein the tether connects the mobile platform to the body via the coupling element; and an actuator configured to vary the length of the tether extending between the coupling element and the mobile platform to control the position of the mobile platform relative to the body of the core platform.

The assembly apparatus may further comprise a deployable truss configured to space the coupling element from the body of the core platform when deployed.

The assembly apparatus may comprise a plurality of deployable trusses and a plurality of tethers, the coupling element being located on distal end of each truss when deployed and being configured to receive a tether to connect the mobile platform to the core platform.

Preferably, the body of the core platform is a central body and the plurality of trusses are extendable outwardly from the central body.

The assembly apparatus may comprise at least one separate tether coupled to the each coupling element at a coupling point, the coupling point of each truss defining a workspace of the apparatus when the truss is deployed.

In some embodiments, the plurality of trusses may form a three-dimensional frame when deployed which defines a workspace in which the mobile platform can be moved in each of the three dimensions.

The assembly apparatus may further comprise an actuator for each tether so that the lengths of the tethers extending between the coupling points and the mobile platforms can be varied independently in order to position the mobile platform in any position in the workspace.

In some embodiments, the assembly apparatus may further comprise an additional tether extending directly between the body of the core platform and the mobile platform and an additional actuator to control the length of the additional tether.

The actuators may be located on the body of the core platform. Preferably, the actuators may be located on the coupling elements located at the distal end of the trusses of the core platform when the trusses are deployed. Alternatively, the actuators may be located in the mobile platform.

The end effector may comprise a robotic manipulator, the robotic manipulator being configured to perform an assembly or manufacturing task.

In some embodiments, the body of the core platform may comprise a storage compartment for storing structural elements of a spacecraft to be assembled and/or repaired.

In accordance with another aspect of the invention, there is provided a system for assembling a component of a spacecraft in space, the system comprising: an assembly apparatus as defined by claim 1; and a plurality of structural elements of a component of a spacecraft to be assembled.

In accordance with another aspect of the invention, there is provided a method of assembling a component of a spacecraft in space using an assembly apparatus as defined by claim 1, the method comprising: placing the assembly apparatus in space; deploying a truss to extend from the body of the core platform; adjusting the length of the tether extending between the mobile platform and the coupling element at the distal end of the truss to position the mobile platform proximate to the body; using an end effector on the mobile platform to acquire a structural element from a storage compartment on the body of the core platform; actuating the actuator to vary the length of the tether extending between the mobile platform and the coupling element at the distal end of the truss to position the mobile platform in a specified position relative to the body of the core platform; and placing the structural element in the specified position relative to the body of the core platform using the end effector.

BRIEF DESCRIPTION OF THE DRAWINGS

Embodiments of the invention will now be described, by way of example only, with reference to the accompanying drawings, in which.

DETAILED DESCRIPTION OF THE INVENTION

Figure 1:
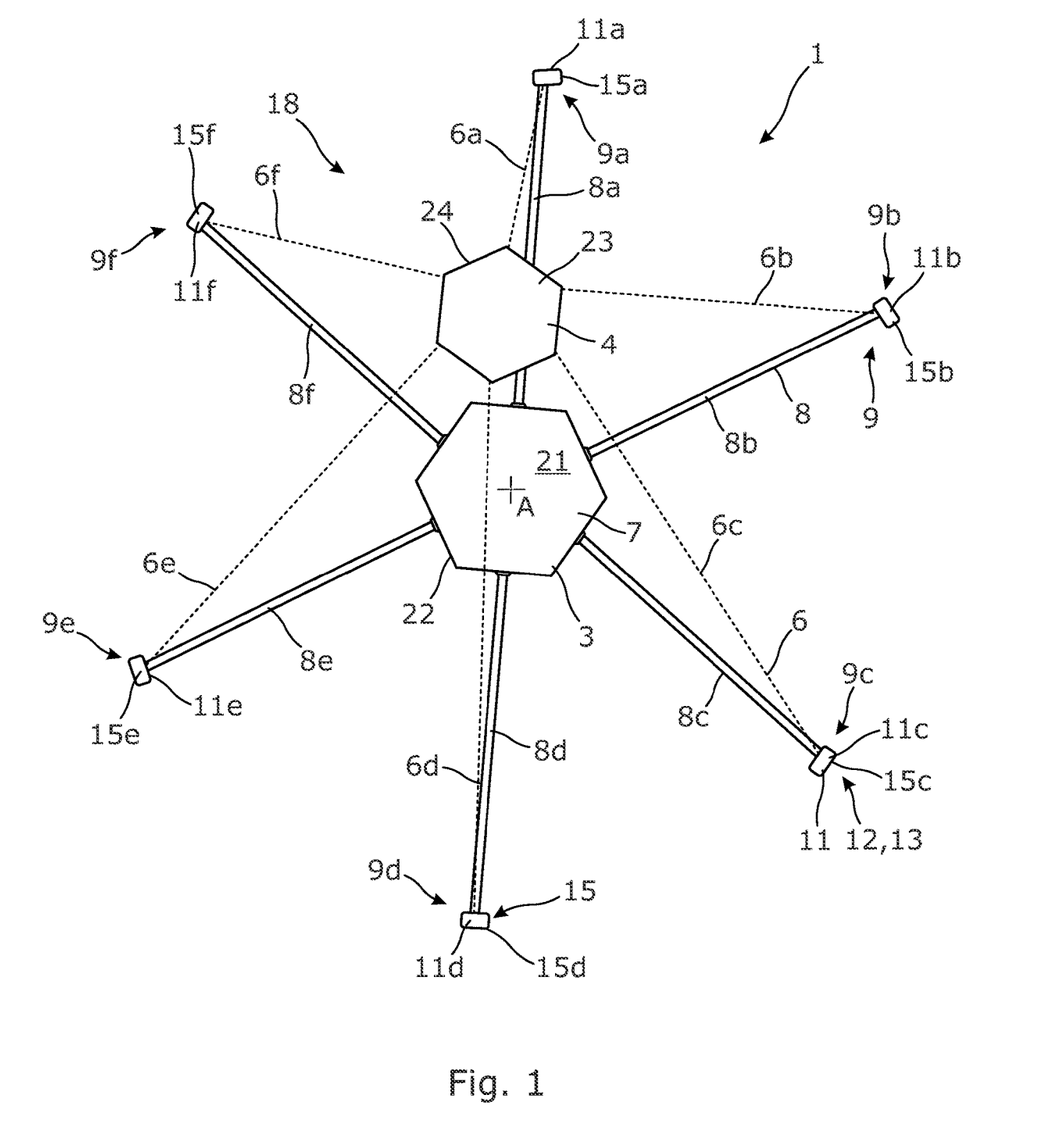
FIG. 1 shows a schematic top view of an assembly apparatus according to the present invention.
Figure 11:
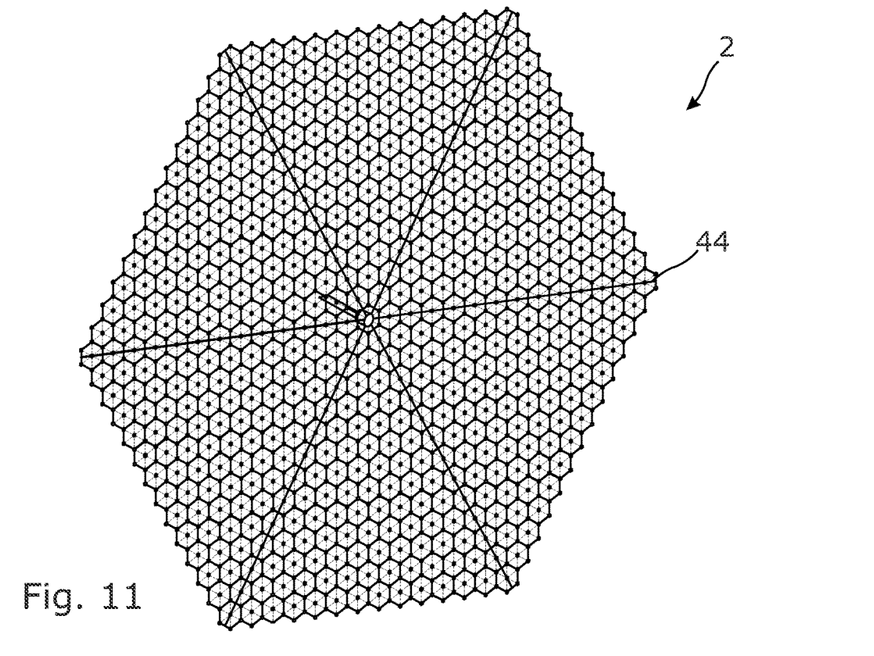
FIG. 11 shows a schematic view of a component of a spacecraft created by the assembly apparatus.

Referring to FIG. 1, an embodiment of an assembly apparatus 1 for assembling a component of a spacecraft 2, an example of which is shown in FIG. 11, in space is shown. The assembly apparatus 1 may be configured to complete assembly of itself once it has been delivered into space in a partially assembled state. The assembly apparatus 1 may also be configured to assemble at least components of other spacecraft 2 once the assembly apparatus 1 is fully assembled. The assembly apparatus 1 may also be configured to carry out repairs on itself or other spacecraft.

The assembly apparatus 1 comprises a core platform 3 and a mobile platform 4. The mobile platform 4 comprises an end effector 5 which in the present embodiment is a robotic manipulator, shown in FIG. 3. The robotic manipulator 5 is configured to carry out an assembly task on a spacecraft 2 or a component of a spacecraft 2, including the assembly apparatus 1, as will be described in more detail hereinafter. It will be appreciated that in alternative embodiments, the end effector 5 may be, for example, but not limited to a device capable of performing at least one of the following operations: manipulation, joining, 3D printing, cutting, forming, etc.

The mobile platform 4 is connected to the core platform 3 by a tether 6. The core platform 3 comprises a body 7 and a truss 8 extending from the body 7. The truss 8 comprises a distal end 9 spaced from the body 7 of the core platform 3. The tether 6 connects the mobile platform 4 to the body 7 via the distal end 9 of the truss 8. One function of the tether 6 is to prevent the mobile platform 4 being lost into space in the event of a malfunction which reduces space debris.

Figure 2:
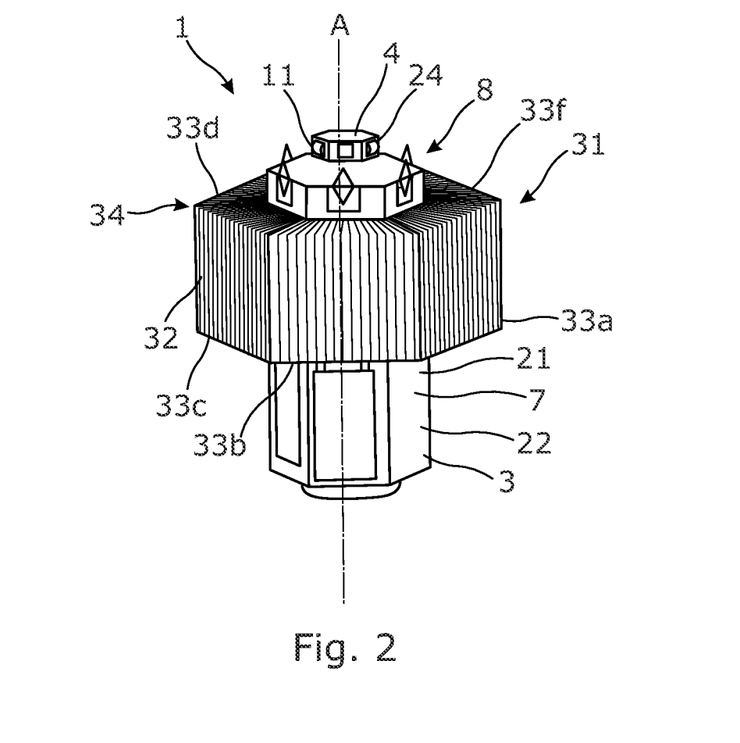
FIG. 2 shows a perspective view of an embodiment of the assembly apparatus shown in FIG. 1 before a truss has been deployed.

The truss 8 is shown in FIG. 1 in its deployed state. However, in order to fit within a launch vehicle (not shown), the truss 8 may be a deployable, machined, or assembled truss 8. That is, the truss 8 may originally be in an undeployed state when the assembly apparatus 1 is launched into space. Referring briefly to FIG. 2, the truss 8 of the core platform 3 can be seen in its undeployed state.

In this example, the truss 8 is extended from the main body 7 of the core platform 3 when the assembly apparatus 1 is in space by telescopically extending the truss 8 from the body 7. However, it will be appreciated that the truss 8 may be deployed by other means, for example, but not limited to, by unfolding the truss 8, by being assembled from elementary parts, i.e. units, or by 3D printing, i.e. manufacturing, the truss 8 in situ.

Figure 3:
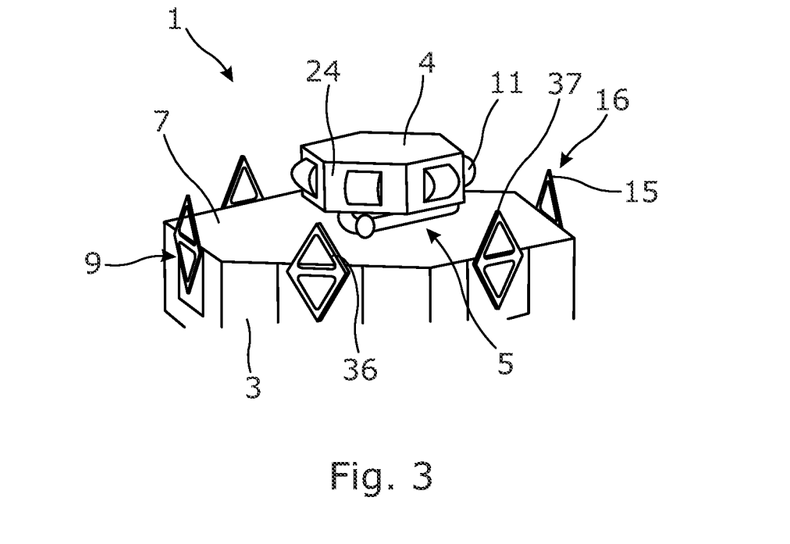
FIG. 3 shows a zoomed in perspective view of a mobile platform of the assembly apparatus shown in FIG. 2.

The assembly apparatus 1 further comprises an actuator 11. In FIG. 1, the actuator 11 is shown located at the distal end 9 of the truss 8. However, in an alternative embodiment, the actuator 11 may be located in a different position on the assembly apparatus 1. For example, in one embodiment, the actuator 11 may be located in the mobile platform 4, as shown in FIG. 3. In another example, the actuator 11 may be located in the body 7 of the core platform 3.

In each embodiment, the actuator 11 is configured to vary the length of the tether 6 extending between the distal end 9 of the truss 8 and the mobile platform 4. Preferably, the assembly apparatus 1 comprises an actuator 11 for each tether 6. The length of the tether 6 is used to determine the position of the mobile platform 4 relative to the body 7 of the core platform 3, as will be explained in more detail hereinafter.

The actuator 11 may comprise a motor 12 configured to rotate a spindle 13 about which a tether 6 can be wound and unwound. By driving the motor 12 so that the tether 6 is wound about the spindle 13, the length of the tether 6 extending between the core platform 3 and the mobile platform 4 can be reduced. By driving the motor so that the tether 6 is unwound from the spindle, the length of the tether 6 extending between the core platform 3 and the mobile platform 4 can be increased.

In the present embodiment, the assembly apparatus 1 comprises a plurality of trusses 8. The present embodiment also comprises a plurality of tethers 6. Preferably, the assembly apparatus 1 comprises at least as many tethers 6 as it does trusses 8. Additionally, the spacecraft assembly apparatus 1 preferably comprises an actuator 11 associated with each truss 8, that is, at least one actuator 11 per truss 8, so that each of the at least one tether 6 associated with a truss 8 is actuated by an actuator 11 that is independent of actuators 11 associated with other trusses 8. Therefore, the assembly apparatus 1 may comprise an actuator 11 for each tether 6. In this way, the mobile platform 4 can be moved in a greater number of directions and can move over a larger area, as will be explained in more detail hereinafter. In some embodiments, the distal end 9 of each truss 8 is configured to receive at least one of the plurality of tethers 6 to connect the mobile platform 4 to the core platform 3.

In addition to the body 7, the core platform 3 comprises a coupling element 15. The coupling element 15 is connected to and extendable from the body 7 such that the coupling element 15 may be spaced from the body 7 of the core platform 3.

Preferably, a tether 6 is coupled to the distal end 9 of each truss 8 by a coupling element 15. That is, the assembly apparatus 1 comprises at least one tether 6 coupled to the distal end 9 of each truss 8 by a coupling element 15. Furthermore, each tether 6 is coupled at one end to an actuator 11, as previously mentioned, and is connected at its other end to an anchor point 16 on the core platform 3, either on the body 7 or on a truss 8, or on the mobile platform 4. More than one tether 6 per truss 8 may be used to provide redundancy for the assembling apparatus 1. In addition, to provide further redundancy, each tether 6 on the same truss 8 may have its own actuator 11.

In the embodiment, shown in FIG. 1, the coupling element 15 for the tether 6 is on the distal end 9 of the truss 8. However, in the present embodiment, the coupling element 15 is formed by the actuator 11. That is, the actuator 11 is located at the distal end 9 of the truss 8 and is connected to the tether 6. Thus, each of the tethers 6 only extend between an actuator 11 at the distal end 9 of a truss 8 and an anchor point 16 on the mobile platform 4.

However, it will be appreciated that in alternative embodiments, when the actuator 11 is located on the body 7 of the core platform 3, the coupling element 15 may comprise a pulley (not shown) configured to provide a pivot or turning point for a tether 6 which extends between the actuator 11 on the body 7 of the core platform 3 and the mobile platform 4. Thus, in such an embodiment, a tether 6 would extend from the body 7 of the core platform 3 along the truss 8 to the coupling element 15 at the distal end 9 of the truss 8 and then back to the mobile platform 4.

In another alternative embodiment, in which the actuator 11 is located on the mobile platform 4 of the assembly apparatus 1, as shown most clearly in FIG. 3, the anchor point 16 may either be on the body 7 of the core platform 3 with a coupling element 15 at the distal end 9 of the truss 8 or the anchor point 16 may be the coupling element 15 at the distal end 9 of the truss 8, as shown in FIG. 3.

An advantage of having the actuator 11 or the anchor point 16 at the coupling element 15, i.e. having the actuator 11 or the anchor point 16 at the distal end 9 of the truss 8, is that it reduces the length of the tether 6 that is required by the assembly apparatus 1.

The coupling element 15, whether formed by an actuator 11, an anchor point 16, or pulley, may be capable of rotating to face coupling element 15 on the end of other trusses 8 to facilitate movement of the mobile platform 4. That is, the coupling element 15 may be rotatable so that the tether 6 which extends between the coupling element 15 and the mobile platform 4 is able to extend in a straight line. This helps to avoid the tether 6 scraping against the edge of the actuator 11 or pulley 17 as the tether 6 is wound and/or unwound from the spindle 13 and so reduces wear of the tether 6.

The coupling element 15 of each truss 8 defines a workspace 18 in which the mobile platform 4 can operate or perform a task such as assembling a component to be connected to itself, assembling a component for another spacecraft, repairing a component of an existing spacecraft, and/or manufacturing a component. The workspace 18 is defined by the coupling elements 15, which form the vertices of the workspace 18, and the straight line between adjacent coupling elements 15. The coupling element 15 and the straight lines between them define the workspace 18 because they represent the limits to which the actuators 11 on the trusses 8 can move the mobile platform 4. The larger the number of trusses 8, the larger the area of the workspace 18 for a given length of truss 8.

As shown in FIG. 1, the core platform 3 of the assembly apparatus 1 of the presently described embodiment is a central body 21. Furthermore, each of the plurality of trusses 8 extends outwardly from the central body 21. In the present embodiment, each of the trusses 8 extends radially outwards from the central body 21 when viewed from above and are equally spaced about the longitudinal axis A of the central body 21. Each truss 8 shown in FIG. 1 extends in a straight line so that the coupling elements 15 form the vertices of a hexagon, thus defining a hexagonal workspace 18.

The central body 21 comprises side walls 22. The side walls 17 are arranged around the longitudinal axis A of the central body 21. In the present embodiment, each side wall 22 has a truss 8 extending therefrom. As shown in FIG. 1, the present embodiment of the assembly apparatus 1 comprises six trusses 8 which extend from the six side walls 22 of the central body 21 in the radial direction. Therefore, the central body 21 has a hexagonal cross-section with six side walls 22.

However, it will be appreciated that in an alternative embodiment, the central body 21 of the core platform 3 of the assembly apparatus 1 may have a different number of side walls 22 and therefore a different shaped cross-section. Furthermore, it will be appreciated that the number of trusses 8 may be different to the above described embodiment. It will also be apparent that the number of trusses 8 may be different to the number of side walls 22 of the central body 21.

In the present embodiment, the mobile platform 4 also comprises a body 23 formed by six side walls 24. Thus, the body 23 of the mobile platform 4 has a hexagonal cross section. In FIG. 1, the tethers 6 are anchored at an anchor point 16 on vertices 25 of the mobile platform 4. However, it will be appreciated that in other embodiments, the anchor point may be on the side wall 24 of the mobile platform 24.

The mobile platform 4 is moved around within the workspace 18 by operating the actuators 11 on the distal end 9 of each truss 8 independently from one another. Therefore, whilst some of the actuators 11 are winding their associated tether 6 about the spindle 13 of the actuator 11, other actuators 11 may be unwinding the associated tether 6 from their spindle 13 in order to allow movement of the mobile platform 4. As a result, by varying the length of the tethers 6 between the distal ends of the trusses 8 and the mobile platform 4 independently using separate actuators 11, the mobile platform 4 can be placed at any desired position within the workspace 18.

For example, in the embodiment shown in FIG. 1, the mobile platform 4 has been moved from its starting position in the centre of the workspace 18 to the position shown. In this example, the features such as tether 6, trusses 8, and actuators 11 will be referred to as first to sixth, denoted by letters a to f starting with the feature at the top of the page and moving clockwise for subsequent features.

In order to move the mobile platform 4 into the position shown in FIG. 1 from its starting central position, the first actuator 11a and sixth actuator 11f must drive their motors 12a, 12f so that the length of the tethers 6a, 6f extending between the actuators 11a, 11f at the coupling elements 15a, 15f on the distal ends 9a, 9f of the first and sixth trusses 8a, 8f is reduced. As the mobile platform 4 is placed closer to the distal end 9a of the first truss 8a than the distal end of the sixth truss 8f, the length of the first tether 6a between the distal end 9a of the first truss 8a and the mobile platform 4 is less than the length of the sixth tether 6f between the distal end of the sixth truss 8f and the mobile platform 4.

Furthermore, as the mobile platform 4 has been positioned slightly towards the left side of the assembly apparatus 1, the length of the second tether 6b between the distal end 9b of the second truss 8b and the mobile platform 4 is greater than the length of the sixth tether 6f between the distal end 9f of the sixth truss 8f and the mobile platform 4. Therefore, it is clear that positioning the mobile platform 4 within the workspace 18 is achieved by operating the actuators 11 independently to achieve different lengths of tether 6 extending from each distal end 9 of each truss 8.

It will be appreciated that for the mobile platform 4 to have been moved from its central starting position to the position shown in FIG. 1 that the second, third, fourth and fifth actuators 11b, 11c, 11d, 11e must unwind their tethers 6b, 6c, 6d, 6e from their spindles 13b, 13c, 13d, 13e to allow the length of the tethers 6b, 6c, 6d, 6e between the distal ends 9b, 9c, 9d, 9e of the second, third, fourth, and fifth trusses 8b, 8c, 8d, 8e to be increased. The tethers 6 may be unwound from their spindles 13 by driving the motors 12 in the opposite direction to the direction the motors 12 are driven to wind the tethers 6 onto the spindles 13. Alternatively, the force of the other motors 12 winding their tethers 6 in may be used to unwind the wound tethers 6.

Preferably, only the minimum length of tether 6 required extends between the distal end 9 of the truss 8 and the mobile platform 4 to allow the mobile platform 4 to be moved into any given position. That is, the tethers 6 may be kept taut. This enables the tethers 6 to accurately place the mobile platform 4 and ensures that small adjustments have an instant effect on the position of the mobile platform 4. It also allows the mobile platform 4 to be kept in the same plane when moving around the workspace 18 and prevents rotation of the mobile platform.

Referring now to FIGS. 2 and 3, perspective views of the assembly apparatus 1 in its undeployed state are shown, with the tethers 6 omitted for clarity. Furthermore, in the embodiment shown in FIGS. 2 and 3, the actuators 11 can be seen to be located in side walls 24 of the mobile platform 4.

As previously mentioned, the coupling element 15 is connected to and extendable from the body 7 such that the coupling element 15 may be spaced from the body 7 of the core platform 3. That is because before and during launch the trusses 8 are yet to be deployed. Therefore, as shown in FIGS. 2 and 3, before the trusses 8 are deployed, only the coupling elements 15 are located outside of the body 7. Then, as the trusses 8 are deployed the coupling elements 15 are moved further from the body 7.

The mobile platform 4 is located in its starting position in which it is located during launch or when an assembly process is about to begin or has finished. The starting position of the mobile platform 4 is above the body 7 of the core platform 3. Once the assembly apparatus 1 is in space, the trusses 8 of the core platform 3 must be deployed. It can be seen from FIG. 3 that in the present embodiment the distal end 9 of the trusses 8 are located outside the side walls 22 of the central body 21 before the trusses 8 are fully deployed.

As previously mentioned, the trusses 8 may be deployed from their retracted position by, for example, telescopically extending the trusses 8 in the radial direction. Another option is to deploy the trusses 8 by unfolding them from their retracted position. When unfolding the trusses 8, the trusses 8 may be stored inside the mobile platform 4 or outside the mobile platform 4 such that they are aligned substantially parallel to the longitudinal axis A of the central body 21 of the core platform 3. Each truss 8 may comprise multiple folded sections.

As a truss 8 is deployed, i.e. extended or unfolded, the actuator 11 associated with that truss 8 unwinds its tether 6 from the spindle 13 so that the mobile platform 4 may remain in its central starting position proximate to the central body 21 of the core platform 3.

In an alternative embodiment, the trusses 8 may be 3D printed in situ. Therefore, the mobile platform 4 may comprise a 3D printer (not shown) configured to print sections of truss 8 which can then be assembled by the robotic manipulator 5. In order to achieve this, one actuator 11 may reel its tether 6 in fully so that the mobile platform 4 is adjacent the anchor point 16 on the distal end 9 of a truss 8. At this point, a section of a truss 8 can be printed and the robotic manipulator 5 can be used to attach the anchor point 16 to one end of the truss 8 and the other end of the truss 8 to the mobile platform 4. This process can be repeated until the required workspace 18 has been created.

In a further alternative embodiment, the trusses 8 may be 3D printed in situ by a 3D printer located inside the core platform 3. Individual units of the trusses 8, i.e. a section of a truss 8, may be printed and then extruded outwards. Therefore, the coupling element 15 remains at the end of the truss 8 and does not need to be moved by the robotic manipulator 5.

Referring to FIG. 2, the assembly apparatus 1 further comprises a storage compartment 31. The storage compartment 31 is configured to store structural elements 32 of a component of a spacecraft to be assembled and/or repaired, as will be described in more detail hereinafter.

In the present embodiment, the storage compartment 31 is located radially outside of the side walls 22 of the central body 21 of the core platform 3. As shown in FIG. 2, the storage compartment 31 is made up of sections 33a-33f which surround the central body 21 of the core platform 3. Each section 33 of the storage compartment 31 is configured to store structural elements 32 to be placed proximate to the corresponding truss 8 extending from the side wall 22 proximate to which the section 33 of the storage compartment 31 is located. However, it will be appreciated that the sections 33 of the storage compartment 31 may vary in number and do not have to surround the central body 21 of the core platform 3.

The storage compartment 31 is located on the opposite side of the trusses 8 to the mobile platform 4 so that the storage compartment 31 and structural elements 32 stored therein do not inhibit or obstruct movement of the mobile platform 4 around the workspace 18. However, an end 34 of the storage compartment 31 is located such that it is within reach of the robotic manipulator 5 of the mobile platform 4 when the mobile platform 4 is above the storage compartment 31 in the direction parallel to the longitudinal axis A of the central body 21.

Referring to FIG. 3, it can be seen that the anchor point 16 on the coupling element 15 is located at the distal end 9 of the truss 8. The anchor point 16 is located at a distance from the centre of the truss 8. That is, the anchor point 16 is located at a distance from the axis of the truss 8 in the direction of the longitudinal axis A of the central body 21 of the core platform 3. This is because the coupling element 15 comprises a projection 36 having a free end 37. The anchor point 16 is located on the projection 36. In the present embodiment, the projection 36 extends parallel to the longitudinal axis A of the central body 21.

More specifically, the anchor point 16 is located at the free end 37 of the projection 36. The anchor point 16 being located at the end 37 of the projection 36 raises the mobile platform 4 above the trusses 8 so that the mobile platform 4 can be move freely about the workspace 18 without contacting the trusses 8.

Figure 4:
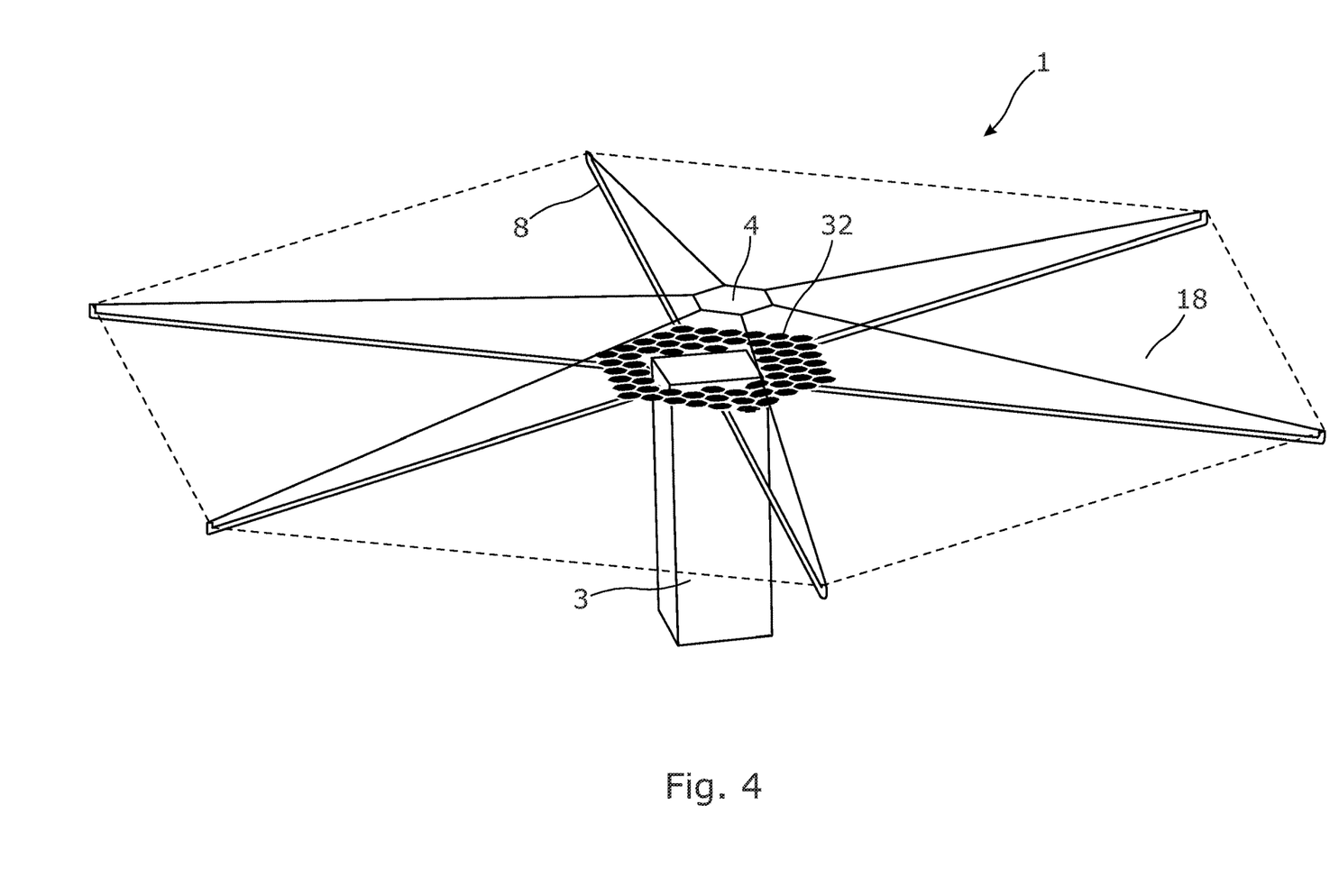
FIG. 4 shows a perspective view of the assembly apparatus shown in FIG. 1 part way through an assembly process.

Referring briefly now to FIG. 4, the embodiment of the assembly apparatus 1 described above can be seen in perspective view with its trusses 8 fully deployed and the tethers 6 shown. It can be seen that the projection 37 allows the tethers 6 and therefore mobile platform 4 to be held clear of the trusses 8 to allow unhindered movement of the mobile platform 4 about the workspace 18.

In FIG. 4, the assembly apparatus 1 has partially completed assembly of a component of a spacecraft. It can be seen that the mobile platform 4 has been moved around the workspace 18 to position a number of structural elements 32 around the central body 21 of the core platform 3. In the present embodiment, the structural elements 32 are hexagonal to maximise the use of space and are shown in FIG. 4 in solid blocks.

FIG. 4 also shows the workspace 18 in dotted lines which give an example of the potential positions in which further structural elements 32 can be placed by the mobile platform 4. In the present embodiment, the trusses 8 extend radially from the central body 21 of the core platform 3 and all extend in the same plane. Therefore, the workspace 18 of the mobile platform 4 is planar, i.e. 2D, as is the array of structural elements 32 that are positioned by the mobile platform 4.

Referring now to FIGS. 5 to 10, a method of assembling a component of a spacecraft 2 using the assembly apparatus 1 described above will be discussed briefly.

Figure 5:
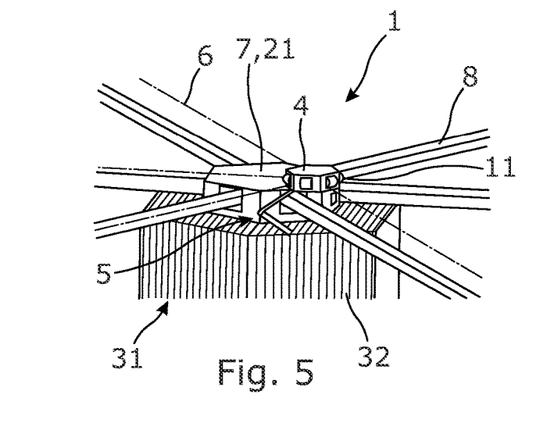
FIG. 5 shows a zoomed in perspective view of the mobile platform of the assembly apparatus of FIG. 1 performing a step of the method of assembling a component of a spacecraft.

FIG. 5 shows a zoomed in perspective view of a method step for assembling a component of a spacecraft 2 using the assembly apparatus 1 after the assembly apparatus 1 has been launched form earth in a launch vehicle and placed into its predetermined position in space. Furthermore, the method step show in FIG. 5 occurs after the trusses 8 of the assembly apparatus 1 have been deployed.

The step illustrated in FIG. 5 is adjusting the length of the tethers 6 extending between the mobile platform 4 and the distal end 9 of the trusses 8 to position the mobile platform 4 proximate to the body 7, 21 of the core platform 3. More specifically, each of actuators 11 is actuated to either wind the associated tether 6 around the spindle 13 or to unwind the associated tether 6 from the spindle 13 in order to position the mobile platform 4 to the body 7, 21 of the core platform 3.

Figure 6:
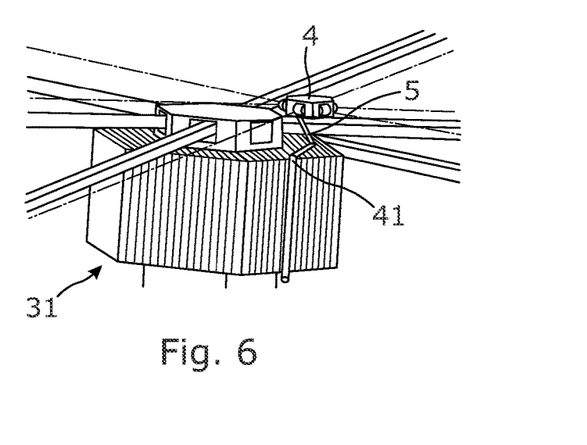
FIG. 6 shows a zoomed in perspective view of the mobile platform of FIG. 5 performing a step of the method of assembling a component of a spacecraft.

As shown in FIG. 5, the actuators 11 are actuated such that the mobile platform 4 is placed close enough to the body 7, 21 of the core platform 3 to enable the robotic manipulator 5 to reach a structural element 32 stored in the storage compartment 31. As shown in FIG. 6, when the mobile platform 4 is correctly placed proximate to the storage compartment 31, the robotic manipulator 5 is extended towards a structural element 32. The robotic manipulator 5 may comprise a grabbing mechanism 41 on its free end which is configured to take hold of the structural element 32. The robotic manipulator 5 is then retracted to remove the structural element 32 from the storage compartment 31.

Figure 7:
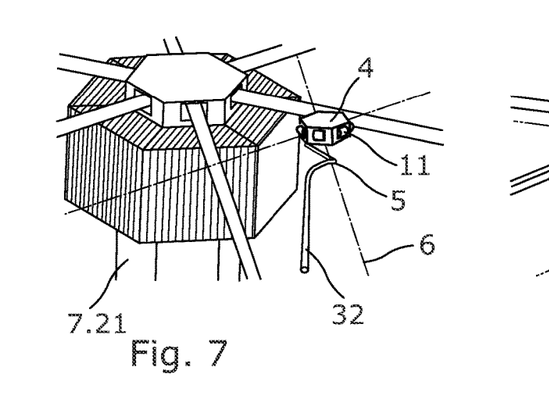
FIG. 7 shows a zoomed in perspective view of the mobile platform of FIG. 5 performing a step of the method of assembling a component of a spacecraft.

Referring now to FIG. 7, each actuator 11 is again actuated to vary the length of the tethers 6 between the mobile platform 4 and the distal ends 9 of the trusses 8 in order to position the mobile platform 4 in a specific position relative to the body 7, 21 of the core platform 3. The specific position of that the mobile platform 4 is moved into by the actuators 11 may be predetermined. For example, the mobile platform 4 may be moved to a safe distance to perform the next step or may be moved into position to place the structural element 32 in its final position.

Figure 8:
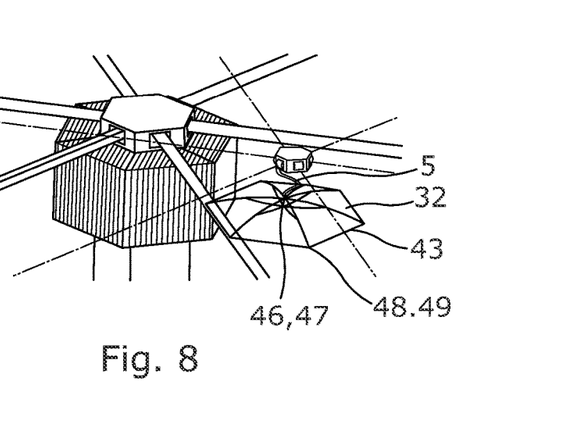
FIG. 8 shows a zoomed in perspective view of the mobile platform of FIG. 5 performing a step of the method of assembling a component of a spacecraft.

Referring to FIG. 8, the structural element 32 that is held by the robotic manipulator 5 is opened up from its stored state into it deployed state. This may be actuated by the robotic manipulator 5 or by the structural element 32 itself.

In the present embodiment, the structural element 32 comprises a tile 43 of a sparse phased-array antenna 44, shown in FIG. 11. Each tile 43 comprises a deployable structure similar to an umbrella. A tile 43 may comprise a dipole 46 and electronic circuits 47 in its centre. Furthermore, the tile 43, or any other structural element 32, may comprise a mechanical link 48 at each vertex 49. The mechanical link 48 is configured to connect neighbouring tiles together and tiles to the trusses 8.

Figure 9:
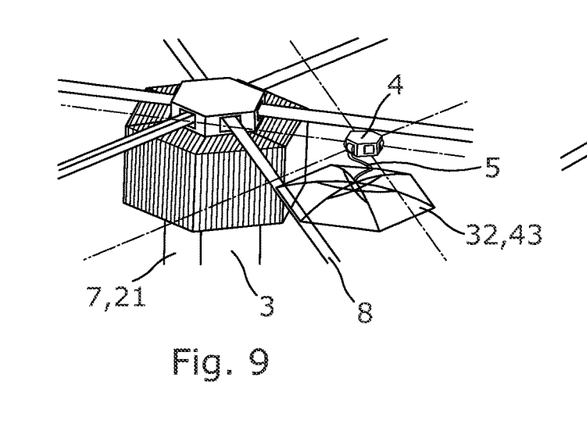
FIG. 9 shows a zoomed in perspective view of the mobile platform of FIG. 5 performing a step of the method of assembling a component of a spacecraft.
Figure 10:
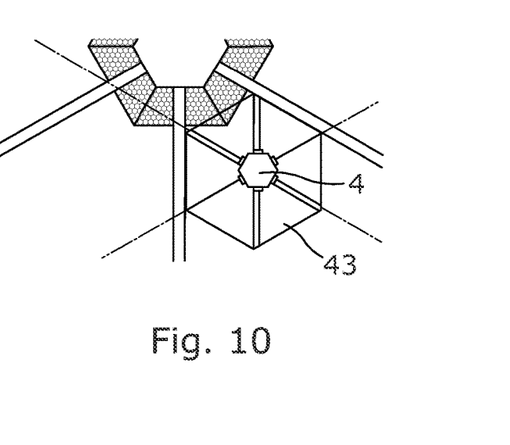
FIG. 10 shows a zoomed in perspective view of the mobile platform of FIG. 5 performing a step of the method of assembling a component of a spacecraft.

Referring to FIG. 9, when the mobile platform 4 is in the correct position relative to the body 7, 21 of the core platform 3, the robotic manipulator 5 extends to precisely position the structural element 32, or tile 43, in its correct position relative to the truss 8 and any other structural elements 32, or tiles 43, that have already been placed in their assembled position. When the tile 43 is positioned in its correct assembled position by the robotic manipulator 5, the mechanical link 48 secures the tile 43 to adjacent tiles 43 and/or the adjacent truss(es) 8. FIG. 10, shows top view of the mobile platform 4 placing a tile 43 into its assembled position.

The method of assembling is repeated until or the structural elements 32, or tiles 43, have been placed in their correct positions to make a fully assembled component of a spacecraft 2, or as discussed in this example sparse phased array antenna, as shown in FIG. 11.

Although the previous embodiments of the assembly apparatus 1 have been described in relation to a two-dimensional or planar workspace 18, it will be appreciated that the assembly apparatus 1 may be configured such that the workspace 18 is three-dimensional. That is, the mobile platform 4 can be moved in all three dimensions. To achieve this, the trusses 8 may extend in different planes to create a workspace 18 of the mobile platform 4 which is three-dimensional and can be used to construct three-dimensional arrays with the assembly apparatus 1. Furthermore, in some embodiments, a three-dimensional array may be constructed whilst using trusses 8 which extend in the same plane. The two above mentioned concepts will now be discussed in more detail.

Figure 12:
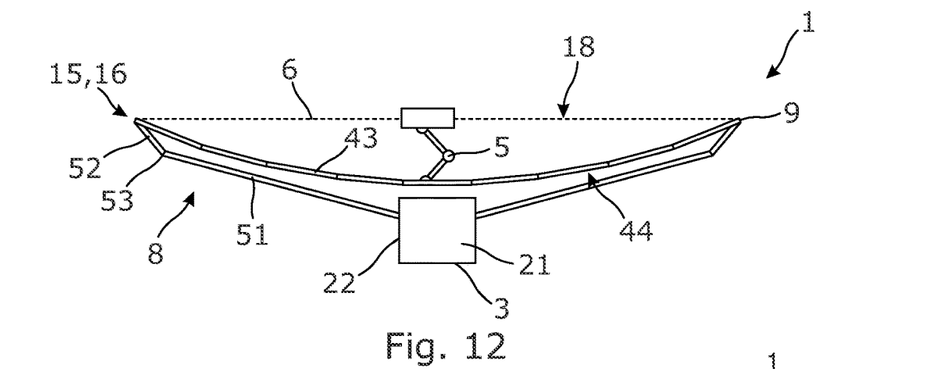
FIG. 12 shows a schematic side view of an embodiment of the assembly apparatus according to the present invention.

Referring to FIG. 12, a further embodiment of the assembly apparatus 1 is shown. The embodiment of the assembly apparatus 1 shown in FIG. 12 is generally the same as the embodiment of the assembly apparatus shown in FIGS. 1 to 11 and so a detailed description will be omitted. Furthermore, similar features and components of the assembly apparatus 1 will retain similar terminology and reference numbers.

The main difference between the embodiment of the assembly apparatus 1 shown in FIG. 4, and the embodiment of the assembly apparatus in FIG. 12 is that the trusses 8 of the present embodiment do not all extend in the same plane. Referring to the schematic side view of the assembly apparatus 1 shown in FIG. 12, a truss 8 extends from the side wall 22 of the central body 21 of the core platform 3.

The truss 8 comprises a first section 51 and a second section 52. The first section of the truss 8 forms an inboard section of the truss 8 which extends from the central body 21 of the core platform 3. The second section 52 of the truss 8 forms an outboard section of the truss which extends from a distal end 53 of the first section 51 of the truss 8. The first section 51 of the truss 8 extends from the central body 21 of the core platform 3 at an acute angle to the longitudinal axis A of the central body 21. Therefore, the distal end 53 of the first section 51 of the truss 8 is raised from the perpendicular plane in which the trusses 8 of the first embodiment of the assembly apparatus 1 extend.

The second section 52 of the truss 8 extends at an acute angle to the first section 51 of the truss 8. This creates a section of the truss 8 with a steeper angle compared to the angle created by the inclination of the first section 51 of the truss 8. It will be understood that in some embodiments, the inclination of the first and second sections 51, 52 of the truss 8 will be the same, that is, their longitudinal axis will be parallel, and that in some embodiments, the second section 52 of the truss 8 will be omitted.

As shown in FIG. 12, each of the trusses 8 of the assembly apparatus 8 may comprises the inclined sections 51, 52. This enables the distal ends 9 of the trusses 8 to be spaced by a greater distance in the direction parallel to the longitudinal axis A from the central body 21 of the core platform 3. However, the workspace 18 of the mobile platform 4 is still planar due to the tethers 6 being connected to the distal end 9 of the trusses 8 at the anchoring point 16 which forms the coupling element 15.

In such an embodiment, the components of a spacecraft 2 assembled by the assembly apparatus 1 can still be built in three dimensions due to the reach of the robotic manipulator 5. For example, as shown in FIG. 12, a sparse phased array antenna 44 can be constructed having a parabolic shape by extending the gripping mechanism 41 by different distances from the mobile platform 4 when placing individual tiles 43 in their positions. For example, tiles 43 placed proximate to the periphery of the workspace 18 require the least extension of the robotic manipulator 5, whereas tiles 43 placed at the centre of the workspace 18 require the largest extension of the robotic manipulator 5.

In some instances, the length of the trusses 8 and thus size of the components of the spacecraft 2, or antenna 44, may be so large that the robotic manipulator 5 cannot extend the distance required to place structural elements 32, or tiles 43, proximate to the central body 21 of the core platform 3.

Figure 13:
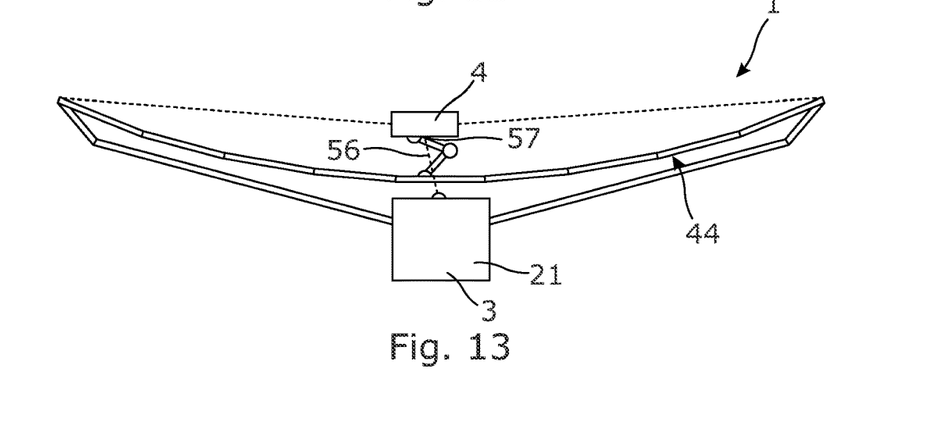
FIG. 13 shows a schematic side view of another embodiment of the assembly apparatus according to the present invention.

Therefore, as shown in FIG. 13, in order to move the mobile platform 4 close enough to the central body 21 of the core platform 3, the assembly apparatus 1 may further comprise an additional tether 56. The additional tether 56 extends between the main central body 21 of the core platform 3 and the mobile platform 4. The additional tether 56 is connected at one end to an additional actuator 57. The additional actuator 57 is configured to vary the length of the additional tether 56 extending between the central body 21 of the core platform 3 and the mobile platform 4.

By driving the motor 12 of the additional actuator 57 to wind the additional tether 56 around the spindle 13 of the additional actuator 57, the mobile platform 4 can be pulled towards the central body 21 of the core platform 3 and away from the plane in which each of the distal ends 9 of the trusses 8 are located. Therefore, the workspace 18 of the mobile platform 4 can be made three dimensional. That is, the mobile platform 4 can be moved in three dimensions to assemble a spacecraft 2, or antenna 44.

Figure 14:
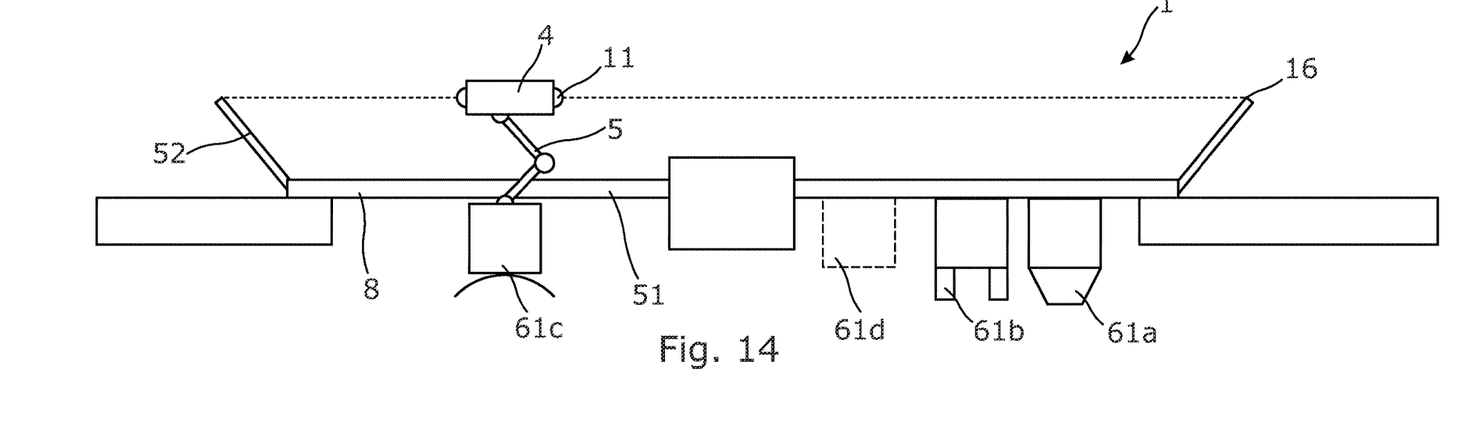
FIG. 14 shows a schematic side view of another embodiment of the assembly apparatus according to the present invention.

Referring briefly to FIG. 14, another use of the assembly apparatus 1 is depicted. As shown, the assembly apparatus 1 may be used to deploy and manage payload elements 61a-61d. In such an embodiment, the assembly apparatus 1 may comprise at least one truss 8 to which payloads 61 can be connected.

The truss 8 may comprise a first section 51 to which payloads can be connected and a second section 52 extending at an angle to the first section 51 which provides an anchor point 16 for a tether 6.

The payloads 61 may be moved along the at least one truss 8 in a similar way to which the tiles 43 described above are deployed. That is, the mobile platform 4 is positioned above a payload, for example payload 61c, and the robotic manipulator 5 is actuated to take hold of the payload 61c. The actuators 11 can then be actuated to move the mobile platform 4 to its new position to reconnect the payload to the truss 8.

Figure 15:
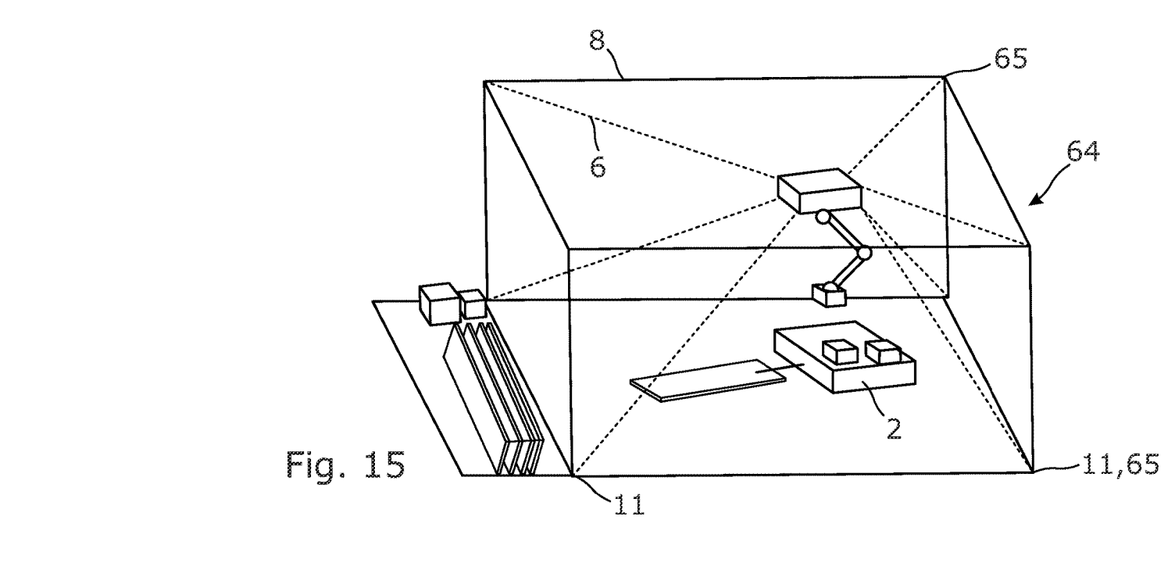
FIG. 15 shows a schematic side view of another embodiment of the assembly apparatus according to the present invention.

Referring now to FIG. 15, a schematic side view of another embodiment of the assembly apparatus 1 is shown. In this embodiment, the plurality of trusses 8 form a three dimensional frame 64. The frame 64 forms a cage like structure in which the mobile platform 4 is moveable. The frame 64 is formed on one side of the body 7 of the core platform 3. The core platform 3 also comprises a storage compartment 31 for storing structural elements 32 for assembling components of the spacecraft 2 in situ.

In the present embodiment, each vertex 65 where trusses 8 of the frame 64 meet comprises an anchor point 16 for a tether 6. The other end of the tether 6 is attached to an actuator 11 on the mobile platform 4. It will be appreciated that in alternative embodiments the anchor points 16 may be on the mobile platform 4 and the actuators 11 may be located at the vertices 65.

Therefore, the plurality of trusses 8 form a three-dimensional frame 64 which defines a three-dimensional workspace in which the mobile platform 4 can be moved in each of the three-dimensions to assemble a component of a spacecraft 2.

The invention claimed is:

1. An assembly apparatus for assembling components of spacecraft in space, the assembly apparatus comprising:
   a core platform; and
   a mobile platform comprising an end effector configured to perform an assembly task;
   the mobile platform being connected to the core platform by a plurality of tethers;
   the core platform comprising a body and a coupling element connected to and extendable from the body such that the coupling element may be spaced from the body of the core platform;
   wherein the core platform further comprises a plurality of deployable trusses having an original undeployed state and a deployed state, wherein the plurality of deployable trusses are configured to space the coupling elements located on a distal end of each truss of the plurality of deployable trusses from the body of the core platform when deployed;
   wherein the coupling elements define vertices of a workspace extending therebetween in which the mobile platform is moveable, wherein each of the plurality of tethers connects the mobile platform to the body via one of the coupling elements; and a plurality of actuators, each of the plurality of actuators associated with one of the plurality of deployable trusses, each actuator is configured to vary the length of one of the plurality of tethers extending between the coupling element on the associated deployable truss and the mobile platform independently in order to control the position of the mobile platform relative to the body of the core platform anywhere within the workspace.

2. The assembly apparatus according to claim 1, wherein the body of the core platform is a central body and the plurality of trusses are extendable outwardly from the central body.

3. The assembly apparatus according to claim 1, wherein the plurality of trusses form a three-dimensional frame when deployed which defines the workspace in which the mobile platform can be moved in each of the three dimensions.

4. The assembly apparatus according to claim 1, wherein the assembly apparatus further comprises an additional tether extending directly between the body of the core platform and the mobile platform and an additional actuator to control the length of the additional tether.

5. The assembly apparatus according to claim 1, wherein the actuators are located on the body of the core platform.

6. The assembly apparatus according to claim 1, wherein the actuators are located on the coupling elements located at a distal end of the trusses of the core platform when the trusses are deployed.

7. The assembly apparatus according to claim 1, wherein the actuators are located in the mobile platform.

8. The assembly apparatus according to claim 1, wherein the end effector comprises a robotic manipulator, the robotic manipulator being configured to perform an assembly task.

9. The assembly apparatus according to claim 1, wherein the body of the core platform comprises a storage compartment for storing structural elements of a spacecraft to be assembled and/or repaired.

10. A system for assembling a component of a spacecraft in space, the system comprising:
an assembly apparatus according to claim 1; and
a plurality of structural elements of a component of a spacecraft to be assembled.

11. A method of assembling a component of a spacecraft in space using an assembly apparatus according to claim 1, the method comprising:
placing the assembly apparatus in space;
deploying a plurality of trusses to extend from the body of the core platform;
adjusting the length of the tether extending between the mobile platform and the coupling elements at a distal end of the plurality of trusses to position the mobile platform proximate to the body;
using an end effector on the mobile platform to acquire a structural element from a storage compartment on the body of the core platform;
actuating the actuators independently to vary the length of the tether extending between the mobile platform and the coupling elements at the distal end of the plurality of trusses to position the mobile platform in a specified position relative to the body of the core platform; and
placing the structural element in the specified position relative to the body of the core platform using the end effector.

* * * * *